United States Patent [19]

Shanley, II

[11] 4,412,244
[45] Oct. 25, 1983

[54] SWITCHING CIRCUIT FOR TELEVISION RECEIVER ON-SCREEN DISPLAY

[75] Inventor: Robert L. Shanley, II, Indianapolis, Ind.

[73] Assignee: RCA Corporation, New York, N.Y.

[21] Appl. No.: 323,197

[22] Filed: Nov. 20, 1981

[51] Int. Cl.³ .............................................. H04N 9/535
[52] U.S. Cl. ...................................... 358/22; 358/183
[58] Field of Search ..................................... 358/183, 22

[56] References Cited

U.S. PATENT DOCUMENTS 4,363,033 12/1982 Lovely ................................. 358/183

OTHER PUBLICATIONS

Motorola TDA 3300 Video Processor Integrated Circuit: Diagram Showing External IC Connections (FIG. 6), and Two Sheets of the Schematic Circuit Diagram of the Integrated Circuit.
The Signal Processing Schematic of the RCA CTC-81B Color Television Receiver Chassis, as Published in RCA Television Service Data Bulletin No. C-9 (1975) Available from the RCA Consumer Electronics Division, Technical Publications, Indianapolis, Indiana (pp. 16-20 and 23,24).

Primary Examiner—Richard Murray
Attorney, Agent, or Firm—Eugene M. Whitacre; Paul J. Rasmussen; Ronald H. Kurdyla

[57] ABSTRACT

Auxiliary graphics information signals to be displayed by the kinescope of a television receiver during on-screen display intervals are applied to the kinescope via a video signal coupling path of the receiver by means of a gated transistor and a differentially controlled current steering switch which are controlled by graphics timing signals. A current source for the current steering switch supplies an operating current for the video path when normal video signals are to be displayed, operating current for the gated transistor when graphics signals of a color other than black are to be displayed, and operating current for blanking the video path to produce a black graphics display.

19 Claims, 4 Drawing Figures

IMAGE SCANNING

| TIME | TRANSISTOR CONDUCTION STATES FOR ON-SCREEN DISPLAY | | | | |
|---|---|---|---|---|---|
| | <u>52,54</u> | <u>40</u> | <u>41</u> | <u>56</u> | <u>57</u> |
| $T_0$ | OFF | ON | ON | ON | OFF |
| $T_1$ | OFF | OFF | OFF | OFF | ON |
| $T_2$ | ON | OFF | ON | ON | OFF |
| $T_3$ | OFF | OFF | OFF | OFF | ON |
| $T_4$ | OFF | ON | ON | ON | OFF |

SWITCHING CIRCUIT FOR TELEVISION RECEIVER ON-SCREEN DISPLAY

This invention concerns an arrangement for applying auxiliary graphics information signals to color television receiver circuits for enabling on-screen kinescope display of the graphics information.

Many color television receivers include provision for electronic on-screen kinescope display of graphics characters representative of the number of the channel to which the receiver is tuned, for example. Such displays are typically generated by replacing normal video information with appropriately horizontally and vertically synchronized graphics representative signals developed by a suitable graphics character generator in the receiver, so that the graphics information is displayed on a given portion of the kinescope screen. One system of this type is described in U.S. Pat. No. 3,984,828—Beyers. Information displayed by such systems can include alphanumeric and graphics information alone (e.g., "video games" and data displays), or mixed video and graphics information (e.g., superimposed channel number, time, subtitles, weather, sports or road traffic information), by employing appropriate electronic control circuits in the receiver. Graphics information signals are also commonly associated with a Teletext system, which involves transmitting graphics information through conventional television transmitting equipment, and receiving, decoding and displaying the graphics information by means of a television receiver in a known manner.

It is desirable in an on-screen display system to reproduce the graphics information in a manner which maintains good definition along the edges of displayed graphics images. In such a system it is also desirable to arrange the circuits which couple signals to the kinescope, and associated circuits which supply the graphics information signals, in a manner which makes economical use of operating supply currents. The latter requirement is particularly important in a system wherein the kinescope signal coupling circuits, and the associated circuits which supply the graphics information signals to the kinescope signal coupling circuits, are constructed in an integrated circuit. In such case excessive operating currents should be avoided to reduce the power dissipation of the integrated circuit, thereby enhancing its reliability. These objectives are accomplished by a circuit arrangement according to the present invention.

In accordance with the present invention, a graphics signal input circuit is coupled to a video signal coupling path which normally supplies color representative video signals to the kinescope of the receiver. The graphics circuit includes a differentially controlled current steering network to provide fast switching between normal video and graphics display intervals in response to graphics timing signals. A current source for the current steering network supplies an operating current for the video path when normal video signals are to be displayed. The current source also supplies an operating current when graphics signals of a color other than black are to be displayed, and operating current for blanking the video path to produce a black graphics display.

In the drawing

Figure 1:
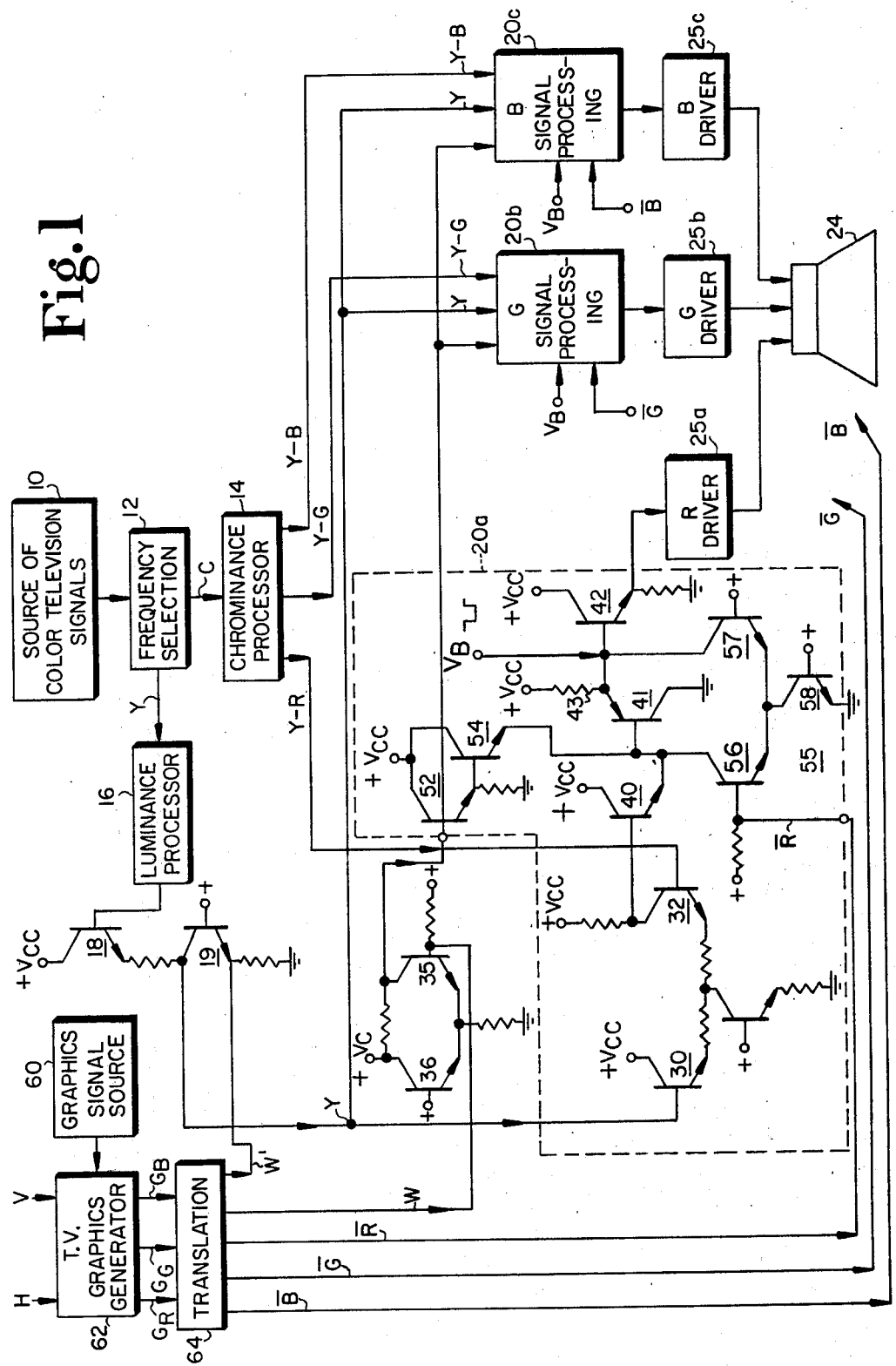
FIG. 1 shows a portion of a color television receiver, partly in block diagram form and partly in schematic circuit diagram form, including a graphics signal coupling circuit according to the present invention.

In FIG. 1, color television signals from a source 10 are processed by a frequency selection network 12 (e.g., including a comb filter) to produce separated luminance (Y) and chrominance (C) components of the television signal. A chrominance processor 14 responds to the separated chrominance component for developing Y−R, Y−G and Y−B color difference signals, which are respectively coupled to red, green and blue signal processing networks 20a, 20b and 20c. The separated luminance signal is coupled via a luminance processor 16 and an emitter follower transistor 18 to each of networks 20a, 20b and 20c, where the luminance signal is combined with the respective color difference signals to produce output red, green and blue color image representative signals. These color signals are applied to a color kinescope 24 via respective red, green and blue video output driver stages 25a, 25b and 25c for reproducing an image on the screen of the kinescope.

Color signal processing networks 20a, 20b and 20c are similar in structure and operation. Therefore the following description of red color signal processing network 20a also applies to networks 20b and 20c.

Network 20a includes an input matrix amplifier comprising differentially connected transistors 30 and 32 which respectively receive the luminance signal and the Y−R red color difference signal. A red color signal is developed in the collector output circuit of transistor 32, and is supplied to red signal driver 25a by means of a coupling network comprising a plurality of cascade connected emitter follower transistors 40, 41 and 42.

Output signals from network 20a are supplied to driver 25a via the low impedance emitter output of NPN transistor 42. The output of network 20a is blanked during normal horizontal and vertical image blanking intervals of the television signal in response to a negative-going blanking signal $V_B$ applied to the emitter of PNP follower transistor 41. The low impedance emitter output of NPN follower transistor 40 serves as a convenient point for sensing the black reference level of the television signal, which occurs during a reference interval within each horizontal image retrace blanking interval. Transistor 40 is situated near the end of the video signal processing channel, just prior to the kinescope driver stage, and thus represents a convenient low impedance point for sensing the cumulative effects of DC level shifts associated with preceding circuits, particularly when these circuits are largely DC coupled. For this purpose the emitter of transistor 40 can be coupled to the signal sensing input of a keyed black level clamping circuit of the type disclosed in U.S. Pat. No. 4,197,557 for example. As disclosed therein, a keyed comparator has one input for sensing the black reference level of the video signal, which is representative of picture brightness, and another input coupled to a source of brightness reference voltage (e.g., a viewer adjustable brightness control potentiometer). An output control signal from the comparator is applied to preceding circuits of the video channel for adjusting the DC level of the video signal, and therefore picture brightness, to a level consistent with the setting of the brightness control.

Follower transistor 41 and 42 form a temperature compensated "zero offset voltage" network between the emitter output of follower 40 and the input of driver 25a. Follower transistor 41 also serves to buffer the emitter of transistor 40 during the horizontal and vertical blanking intervals so that, when the emitter of transistor 40 is used as a black level clamp sensing point, the black reference level to be sensed is not disturbed by blanking signal $V_B$.

Network 20a also includes emitter follower transistors 52 and 54 connected in a Darlington configuration, and a switched current steering network 55 comprising differentially connected transistors 56, 57 and an associated current source transistor 58 which supplies an operating current of approximately one milliampere for current steering transistors 56 and 57. Transistors 52, 54 and network 55 enable the receiver to operate in an "on-screen" display mode for the purpose of displaying auxiliary graphics information during prescribed intervals, as will now be discussed.

Signals representative of graphics information to be displayed are provided by means of a graphics signal source 60. For example, when the graphics information to be displayed corresponds to the number of the broadcast channel to which the receiver is tuned, source 60 responds to signals derived from the channel tuning system of the receiver to develop a binary coded signal representative of the channel number to which the receiver is tuned. This signal is applied to a suitable graphics signal generator 62 (e.g., a microprocessor). Graphics generator 62 is synchronized by horizontal (H) and vertical (V) scanning rate signals to cause the graphics data to be displayed in a particular segment of the viewing screen of the kinescope. Other information such as the time of day and Teletext information can also be applied to generator 62 for suitable conversion to video signal display format. Signals from source 60 contain intelligence for determining when graphics information is to be displayed instead of normal broadcast video information, and the color of the displayed graphics information, for example.

Figure 2:
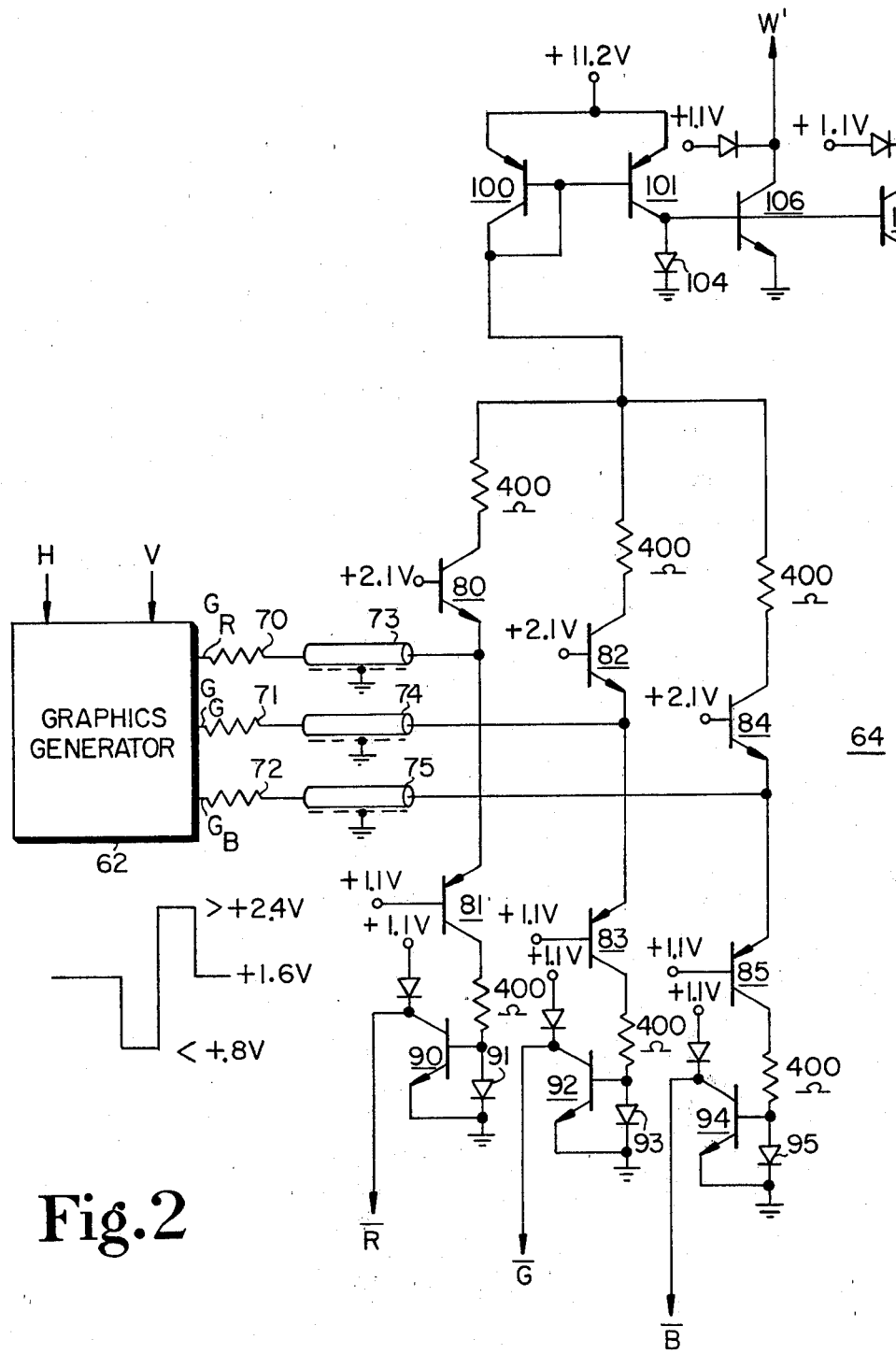
FIG. 2 shows circuit details of a graphics signal translating network employed in conjunction with the graphics coupling circuit of FIG. 1.

Graphics character generator 62 provides plural, suitably timed output signals $G_R$, $G_G$ and $G_B$ respectively corresponding to red, green and blue graphics signal information. These signals are supplied to a graphics signal translating network 64 which provides output "black drive" graphics switching signals $\overline{R}$, $\overline{G}$, $\overline{B}$ and output "white drive" graphics switching signals W and W'. FIG. 2 shows circuit details of translator 64.

In FIG. 2, graphics generator 62 provides tri-state logic outputs with respect to each of the $G_R$, $G_G$ and $G_B$ graphics signals. As indicated by the waveform, the tri-state logic output signal manifests a first logic level of +1.6 volts when no graphics information is to be displayed (i.e., when the kinescope responds normally to display broadcast video signals), a second logic level of less than +0.8 volts when graphics information is to be displayed with a color other than black, and a third logic level of greater than +2.4 volts when black graphics information is to be displayed. The outputs of graphics generator 62 are respectively coupled to inputs of circuit 64 via current determining resistors 70, 71, 72 and conductors (e.g., shielded cables) 73, 74, 75.

Circuit 64 comprises complementary conductivity type emitter coupled, emitter input transistor pairs 80 and 81, 82 and 83, and 84 and 85 which respectively respond to graphics signals $G_R$, $G_G$ and $G_B$. Collector currents conducted by transistors 81, 83 and 85 are respectively replicated by means of current mirror circuits including transistor 90 and diode 91, transistor 92 and diode 93, and transistor 94 and diode 95. Graphics switching control signals $\overline{R}$, $\overline{G}$ and $\overline{B}$ are derived from the collector outputs of transistors 90, 92 and 94. The levels of signals $\overline{R}$, $\overline{G}$ and $\overline{B}$ are a function of the conductive state of associated current mirror transistors 90, 92 and 94 in response to the level of graphics signals $G_R$, $G_G$ and $G_B$. Collector currents conducted by transistors 80, 82 and 84 are combined and replicated by means of current mirror circuits including diode connected transistor 100 and transistor 101, diode 104 and transistor 106, and diode 104 and transistor 108. Graphics switching control signals W and W' are similar in timing and magnitude and are derived from the collector outputs of transistors 108 and 106, respectively. The levels of signals W and W' are a function of the conductive state of current mirror transistors 108 and 106 in response to the graphics signals from generator 62. Translating circuit 64 is discussed in greater detail in a copending U.S. patent application Ser. No. 323,351 of R. L. Shanley, II, et al. titled "Translating Circuit for Television Receiver On-Screen Graphics Display Signals."

Continuing with FIG. 1, signal W from network 64 is applied to the base input of a transistor 35 which is arranged in a differential configuration and a transistor 36. A control signal developed at the collector output of transistor 35 in response to the level of signal W is applied to Darlington connected emitter follower transistors 52 and 54 at a first graphics control input of red signal processing circuit 20a. The control signal from transistor 35 is also applied to corresponding graphics control inputs of green and blue signal processing networks 20b and 20c. Signal W' from network 64 is coupled to the emitter of a current source transistor 19 associated with luminance signal coupling transistor 18. Signal $\overline{R}$ from network 64 is applied to the base electrode of differentially connected transistor 56 of red signal processing network 20a, corresponding to a second graphics control input of network 20a. Signals $\overline{G}$ and $\overline{B}$ are respectively applied to corresponding second graphics control inputs of green and blue signal processing networks 20b and 20c.

Figures 3, 4:
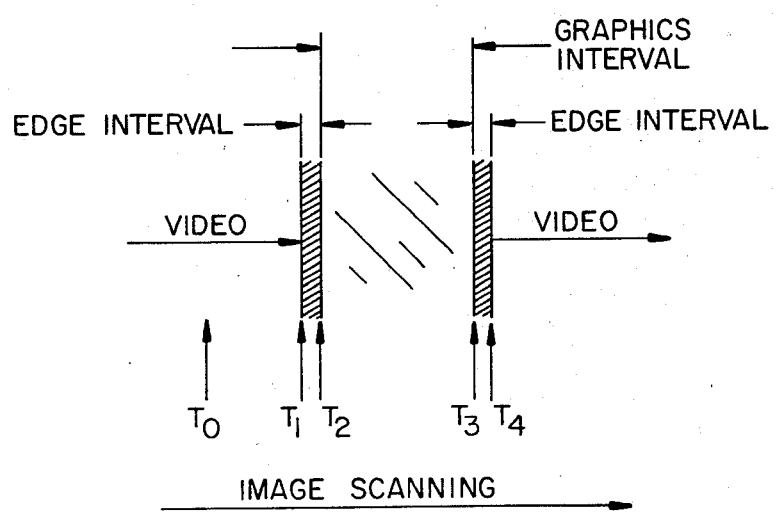
FIG. 3 illustrates a portion of a displayed graphic symbol generated by the arrangement of FIG. 1.
FIG. 4 shows a table depicting the operating states of circuit elements associated with the graphics signal coupling circuit.

The operation of the system of FIG. 1 in a normal video display mode and in a graphics display mode will now be discussed in conjunction with FIGS. 1, 3 and 4. For purposes of the following discussion it will be assumed that the graphics information to be displayed comprises a red graphics character occurring during a graphics interval, preceded and followed by a narrow black border occurring at the edges of the graphics symbol. Accordingly, FIG. 3 depicts a portion of one horizontal image scanning line. Normal video information is displayed during time $T_0$ prior to time $T_1$, and after time $T_4$. The on-screen display interval comprises a leading black edge interval from time $T_1$ to $T_2$, a graphics symbol display interval between times $T_2$ and $T_3$, and a following black edge interval from time $T_3$ to $T_4$.

The table in FIG. 4 shows the conductive ("ON") and non-conductive ("OFF") states of transistors 52, 54, 40, 41, 56 and 57 in processor 20a of FIG. 1 for producing the display shown in FIG. 3. Thus during the normal video signal intervals during time $T_0$ and after time $T_4$, emitter follower transistors 40 and 41 couple video signals from transistor 32 to transistor 42, which in turn couples the video signals to driver 25a. At this time signal W' maintains current source transistor 19 in a normal conductive state for permitting transistor 18 to conduct luminance signals normally, while signal W biases transistor 35 so that transistors 52 and 54 are rendered non-conductive. Signal $\overline{R}$ biases differentially connected current steering transistor 56 to conduct, whereby the current from current source transistor 58 is conducted by signal coupling follower transistor 40 via transistor 56. Thus during the normal video signal image intervals transistor 58 represents the current source for follower transistor 40. During this time signal processing networks 20b and 20c exhibit the same operating condition as network 20a.

At the beginning of the on-screen display interval commencing at time $T_1$, differential switching transistor 56 is rendered non-conductive in response to signal $\overline{R}$, whereby transistor 57 conducts and the current from current source transistor 58 now flows through transistor 57. Specifically, current from transistor 58 flows in a path including emitter resistor 43 of transistor 41 and transistor 57. This conductive state of switching transistor 57 renders emitter follower transistors 40 and 41 non-conductive, and provides the mechanism whereby current source transistor 58 sources the current for producing a black display (i.e., the output of network 20a is blanked). Transistors 52 and 54 remain nonconductive in response to signal W. Accordingly, normal video signals are inhibited in the output of network 20a, and the kinescope produces a black display. In this case the black display occurs during the edge interval between times $T_1$ and $T_2$, during which time signal processing networks 20b and 20c exhibit the same operating condition as network 20a.

At the beginning of the (red) graphics display interval commencing at time $T_2$, differentially connected current steering transistors 56 and 57 change conductive state in response to signal $\overline{R}$ such that transistor 56 is rendered conductive and transistor 57 is rendered non-conductive. Therefore the current from source transistor 58 is conducted by transistor 56. At this time graphics drive transistors 52 and 54 are rendered conductive in response to signal W, and the emitter current of transistor 54 is supplied by current source transistor 58 via switching transistor 56. The emitter of transistor 40 is reverse biased in response to the bias supplied from the emitter of conductive transistor 54, and emitter follower coupling transistor 41 returns to a conductive state in response to switching transistor 57 being non-conductive. Transistors 41 and 42 therefore conduct a red graphics enabling signal to red driver 25a between times $T_2$ and $T_3$ for producing a red graphics display in response to the output of conductive graphics drive transistors 52, 54. It is noted that during the graphics interval the operating current for graphics signal drive transistor 54 is supplied by current source transistor 58 via transistor 56.

The outputs of green and blue signal processing networks 20b and 20c are blanked during the red graphics display interval in response to signals $\overline{G}$ and $\overline{B}$. These signals cause the switching transistors in networks 20b and 20c which correspond to switching transistors 56 and 57 of network 20a to exhibit the conductive states required for rendering the follower transistor corresponding transistor 41 non-conductive, in the manner discussed previously (i.e., corresponding transistors 56 and 57 in networks 20b and 20c are rendered non-conductive and conductive, respectively).

During the following black edge interval between times $T_3$ and $T_4$, the operating condition of networks 20a, 20b and 20c is the same as during leading black edge interval $T_1$–$T_2$ discussed previously. Similarly, the operating condition of these networks during the normal video interval after time $T_4$ is the same as during the video interval including time $T_0$, as also discussed previously.

Colors other than red can be displayed during the graphics interval. For example, white can be displayed when signal processing circuits 20a, 20b and 20c all exhibit the operating condition shown in the table of FIG. 4 for the interval between times $T_2$ and $T_3$. In such case the outputs of all of these networks will be enabled, or unblanked, during the graphics interval. A yellow color graphic can be displayed when red signal processing network 20a and green signal processing network 20b both exhibit the operating condition shown in FIG. 4 for the interval from time $T_2$ to $T_3$, and when blue signal processing network 20c exhibits the condition shown in FIG. 4 for the interval from time $T_1$ to $T_2$ except that corresponding transistors 52 and 54 in network 20c are "ON" or conductive. In this case the outputs of red and green networks 20a and 20b will be enabled or unblanked, and the output of the blue network 20c will be blanked, whereby a yellow kinescope display will be produced.

Transistors 52, 54 of network 20a and the corresponding transistors in networks 20b and 20c are rendered conductive whenever a color other than black is to be displayed during on-screen display intervals. During the graphics interval from time $T_2$ to $T_3$, current source transistor 19 increases conduction in response to signal W' for shifting the DC level of the luminance signal derived from the collector of transistor 19 in a direction to insure that follower transistor 40 remains off.

The described system is capable of producing several colors during the on-screen display intervals, including black and white, the primary colors red, green and blue, and complementary colors yellow, cyan and magenta, by unblanking the outputs of appropriate combinations of red, green and blue signal processing networks 20a, 20 b and 20c.

The described arrangement of network 20a, and corresponding networkds 20b and 20c, make efficient use of operating supply current during the normal video and on-screen display modes. During the normal video display mode, operating current for video signal coupling emitter follower transistor 40 is provided by current source transistor 58 of switching network 55 via transistor 56. Current source transistor 58 also supplies the operating current for graphics drive emitter follower transistor 54, via switching transistor 56, during the on-screen display mode when a color other than black is to be displayed. Current source transistor 58 furthermore supplies, via switching transistor 57, the current required to blank the output of the signal processing network when a black color is to be displayed in the on-screen display mode. The use of a single current source transistor 58 in this manner conserves operating current utilization, and is particularly advantageous when signal processing networks 20a, 20b and 20c are constructed in the same integrated circuit. Idle current is reduced, thereby reducing the power dissipation of the integrated circuit and accordingly increasing the reliability of the integrated circuit. In addition, integrated circuit surface is conserved since separate current sources are not required.

Current source transistor 58 also advantageously supplies the operating current for transistors 56 and 57, which are arranged as a differentially controlled current steering switching network. The differential arrangement and control of transistors 56 and 57 desirably permits a fast switching response time (e.g., at times $T_1$, $T_2$, $T_3$ and $T_4$) since only a small change in the level of signal $\overline{R}$ is required to switch transistors 56 and 57 from one conductive state to another.

The displayed graphics information exhibits good edge definition as a result of the manner in which switching transistors 56 and 57 are coupled to the low impedance emitter outputs of transistors 40, 41 and 54.

When switching transistor 57 conducts at times $T_1$ and $T_3$ at the beginning of the black edge intervals, any transient switching spikes which may be developed (e.g., due to parasitic capacitance effects) exhibit a negative-going, blacker-than-black direction. Accordingly, such transient effects are essentially imperceptible to a viewer.

At time $T_2$, when transistor 41 conducts at the beginning of the graphics interval, transistor 41 turns on in response to switching transistor 57 turning off. The effects of parasitic induced switching transients are significantly reduced due to clamping action at the emitter of transistor 41, wherein any transients are clamped to a level equal to $1V_{BE}$ above the base voltage of transistor 41. In this regard the emitter of transistor 41 resembles a low impedance voltage source. Transistors 54 and 56 are also turned on at time $T_2$, at which time the low output impedance emitter of transistor 54, which conducts current via switching transistor 56, resembles a voltage source. As such, transistor 54 can easily drive any parasitic capacitances and thereby significantly reduces the likelihood of parasitic induced transients being developed.

Similar observations apply at time $T_4$, when the system returns to the normal video display mode. At this time switching transistor 56 and signal coupling transistor 40 turn on. The low output impedance emitter of transistor 40, which conducts current via transistor 56, resembles a voltage source and can easily drive any parasitic capacitances, thereby significantly reducing the likelihood of parasitic induced transients being developed. Emitter follower transistor 41 produces a similar result.

What is claimed is:

1. In an image reproducing system including a kinescope for displaying an image in response to image representative signals applied thereto; a source of image representative video signals; a source of auxiliary image representative graphics signals; and a signal path for coupling image representative signals to said kinescope; graphics display control apparatus comprising:

means coupled to said source of graphics signals for deriving therefrom first and second control signals for timing the display of auxiliary graphics information by said kinescope during intervals within picture intervals of said video signals;

a video coupling transistor responsive to said video signals and having an output coupled to said signal path;

a graphics coupling transistor responsive to said first control signal and having an output coupled to said signal path;

a current source; and a controlled current steering network coupled to said current source and having first and second outputs coupled to said signal path, said current steering network being controlled in response to said second graphics control signal for selectively supplying an operating current from said current source to said video coupling transistor via said first output, and to said graphics coupling transistor via said second output.

2. In an image reproducing system including a kinescope for displaying an image in response to image representative signals applied thereto; a source of image representative video signals; a source of auxiliary image representative graphics signals; and a signal path for coupling image representative signals to said kinescope; graphics display control apparatus comprising:

means coupled to said source of graphics signals for deriving therefrom first and second control signals for timing the display of auxiliary graphics information by said kinescope during intervals within picture intervals of said video signals;

a video coupling transistor responsive to said video signals and having an output coupled to said signal path;

a graphics coupling transistor responsive to said first control signal and having an output coupled to said signal path;

a current source; and a controlled current steering network coupled to said current source and having complementary phased outputs coupled to said signal path, said current steering network being controlled in response to said second graphics control signal for (a) providing an operating current derived from said current source to said video coupling transistor during intervals when video signal information is to be displayed by said kinescope, and (b) providing an operating current derived from said current source to said graphics coupling transistor during intervals when graphics signal information is to be displayed by said kinescope.

3. Apparatus according to claim 2, wherein said current steering network is differentially controlled in response to said second control signal.

4. Apparatus according to claims 2 or 3, wherein said current steering network additionally provides a current derived from said current source to said signal path for blanking the output of said signal path to produce a black kinescope display during graphics display intervals.

5. In an image reproducing system including kinescope for displaying an image in response to image representative signals applied thereto; a source of image representative video signals; a source of auxiliary image representative graphics signals; and a signal path for coupling image representative signals to said kinescope; graphics display control apparatus comprising:

means coupled to said source of graphics signals for providing first and second control signals for timing the display of auxiliary graphics information by said kinescope during intervals within picture intervals of said video signals;

a video coupling transistor responsive to said video signals and having an output coupled to said signal path;

a graphics coupling transistor responsive to said first control signal and having an output coupled to said signal path;

a current source; and a controlled current steering network coupled to said current source and having complementary phased outputs coupled to said signal path, said current steering network being controlled in response to said second graphics control signal for (a) providing an operating current derived from said current source to said video coupling transistor during intervals when video signal information is to be displayed by said kinescope, and (b) providing an operating current derived from said current source to said graphics coupling transistor during intervals when graphics signal information is to be displayed by said kinescope; wherein said signal path comprises a first transistor, corresponding to said video coupling transistor, arranged in cascade with a second transistor having an output coupled to said kinescope;

said output of said graphics coupling transistor is coupled to the output of said first transistor; and said current steering network comprises first and second semiconductor devices with main current conduction paths coupled to said current source, and with mutually complementary phased outputs associated with said current paths and respectively coupled to said output of said first transistor and to said output of said second transistor.

6. Apparatus according to claim 5, wherein
said first and second transistors and said graphics coupling transistor comprise low output impedance voltage follower transistors.

7. Apparatus according to claim 6, wherein
said first and second transistors are of complementary conductivity type.

8. In an image reproducing system including kinescope for displaying an image in response to image representative signals applied thereto; a source of image representative video signals; a source of auxiliary image representative graphics signals; and a signal path for coupling image representative signals to said kinescope; graphics display control apparatus comprising:

means coupled to said source of graphics signals for providing first and second control signals for timing the display of auxiliary graphics information by said kinescope during intervals within picture intervals of said video signals;

a video coupling transistor responsive to said video signals and having an output coupled to said signal path;

a graphics coupling transistor responsive to said first control signal and having an output coupled to said signal path;

a current source; and a controlled current steering network coupled to said current source and having complementary phased outputs coupled to said signal path, said current steering network being controlled in response to said second graphics control signal for (a) providing an operating current derived from said current source to said video coupling transistor during intervals when video signal information is to be displayed by said kinescope, and (b) providing an operating current derived from said current source to said graphics coupling transistor during intervals when graphics signal information is to be displayed by said kinescope; wherein said signal path comprises a first voltage follower transistor, corresponding to said video coupling transistor, with an input coupled to said source of video signals and a low impedance output; and a second voltage follower transistor arranged in cascade with said first voltage transistor and having a low impedance output coupled to said kinescope;

said graphics coupling transistor comprises a third voltage follower transistor with an input responsive to said first control signal, and a low impedance output coupled to said output of said first follower transistor; and wherein one of said complementary outputs of said current steering network is coupled to said outputs of said first and third follower transistors, and the other of said complementary current steering outputs is coupled to said output of said second follower transistor.

9. Apparatus according to claim 8, wherein
said first and second follower transistors are of complementary conductivity type.

10. Apparatus according to claims 8 or 9, wherein
said current steering network comprises first and second differentially connected transistors with interconnected emitters coupled to said current source, and collector outputs.

11. In a color television receiver system including a kinescope driver stage; a color kinescope for displaying a color image in response to image representative signals applied thereto via said driver stage; a source of color image representative video signals; a source of auxiliary image representative graphics signals; and a signal path for coupling image representative signals to said kinescope driver stage; graphics display control apparatus comprising:

means coupled to said source of graphics signals for providing first and second control signals for timing the display of auxiliary graphics information by said kinescope during intervals within picture intervals of said video signals;

a video coupling transistor responsive to said color video signals and having an output coupled to said signal path;

a graphics coupling transistor responsive to said first control signal and having an output coupled to said signal path;

a current source; and a differentially controlled current steering network coupled to said current source and having complementary phased outputs coupled to said signal path, said current steering network being controlled in response to said second graphics control signal for (a) providing an operating current derived from said current source to said video coupling transistor during intervals when video signal information is to be displayed by said kinescope, (b) providing an operating current derived from said current source to said graphics coupling transistor during intervals when graphics signal information is to be displayed by said kinescope; and (c) providing a current derived from said current source to said signal path for blanking the output of said signal path to produce a black kinescope display during graphics display intervals.

12. Apparatus according to claim 11, wherein said signal path comprises a first transistor, corresponding to said video coupling transistor, arranged in cascade with a second transistor having an output coupled to said kinescope;

said output of said graphics coupling transistor is coupled to the output of said first transistor; and said current steering network comprises first and second semiconductor devices with main current conduction paths coupled to said current source, and with mutually complementary phased outputs associated with said current paths and respectively coupled to said output of said first transistor and to said output of said second transistor.

13. Apparatus according to claim 12, wherein said first and second transistors and said graphics coupling transistor comprise low output impedance voltage follower transistors.

14. Apparatus according to claim 13, wherein said first and second transistors are of complementary conductivity type.

15. Apparatus according to claim 11, wherein said signal path comprises a first voltage follower transistor, corresponding to said video coupling transistor, with an input coupled to said source of video signals and a low impedance output; and a second voltage follower transistor arranged in cascade with said first voltage transistor and having a low impedance output coupled to said kinescope;

said graphics coupling transistor comprises a third voltage follower transistor with an input responsive to said first control signal, and a low impedance output coupled to said output of said first follower transistor; and wherein one of said complementary outputs of said current steering network is coupled to said outputs of said first and third follower transistors, and the other of said complementary current steering outputs is coupled to said output of said second follower transistor.

16. Apparatus according to claim 15, wherein said first and second follower transistors are of complementary conductivity type.

17. Apparatus according to claims 15 or 16, wherein said current steering network comprises first and second differentially connected transistors with interconnected emitters coupled to said current source, and collector outputs.

18. Apparatus according to claims 12 or 15, wherein:

said first control signal exhibits a first sense for forward biasing said graphics coupling transistor when graphics information of a color other than black is to be displayed during picture intervals, and exhibits a second sense for reverse biasing said graphics coupling transistor when video signal information is to be displayed during picture intervals;

said current steering network responds to said second control signal for (a) supplying said operating current to said video coupling transistor for enabling said video coupling transistor to conduct video signals during picture intervals; (b) supplying said operating current to said graphics coupling transistor during graphics intervals when said first control signal exhibits said first sense; and (c) conducting a current to said second transistor during graphics intervals with a sense for inhibiting conduction of said second transistor, to thereby blank the output of said signal path and cause said kinescope to produce a black display during graphics intervals.

19. In a color television receiver including a color kinescope for displaying a color image in response to image representative signals applied thereto; a source of color image representative video signals; and a source of auxiliary image representative graphics signals; graphics display control apparatus comprising:

means coupled to said source of graphics signals for providing first and second control signals for timing the display of auxiliary graphics information by said kinescope during intervals within picture intervals of said video signals;

a coupling network for supplying signals to said kinescope, said coupling network comprising:

a first emitter follower transistor of one conductivity type with a base input coupled to said source of color signals, and an emitter output; and a second emitter follower transistor of a complementary conductivity type with a base input coupled to said emitter output of said first follower transistor, and an emitter output;

a graphics signal coupling network comprising a third emitter follower transistor with a base input for receiving said first graphics control signal, and an emitter output coupled to said emitter output of said first follower transistor;

a source of operating current; and a differentially controlled current steering network comprising fourth and fifth emitter coupled transistors having base input and collector output electrodes, said emitters of said fourth and fifth transistors being coupled in common to said source of operating current for receiving operating current therefrom, said collector of said fourth transistor being coupled to said emitter outputs of said first and third emitter follower transistors, said collector of said fifth transistor being coupled to said emitter output of said second emitter follower transistors, and one of said base electrodes of said fourth and fifth emitter coupled transistors being coupled for receiving said second graphics control signal; wherein said fourth transistor is rendered conductive in response to said second control signal for conducting an operating current to said first transistor from said current source for enabling said first transistor to conduct color video signals during picture intervals;

said third transistor is forward biased in response to said first control signal when graphics information of a color other than black is to be displayed, and said fourth transistor is rendered conductive in response to said second control signal for conducting an operating current for said third transistor from said current source; and said fourth transistor is rendered non-conductive and said fifth transistor is rendered conductive in response to said second control signal for conducting from said current source to said emitter output of said second follower transistor with a sense for inhibiting conduction of said second follower transistor, to thereby blank the output of said signal supplying coupling network and cause said kinescope to produce a black display during graphics intervals.

* * * * *